(12) United States Patent
Liang

(10) Patent No.: US 7,564,781 B2
(45) Date of Patent: Jul. 21, 2009

(54) DETERMINING THROUGHPUT BETWEEN HOSTS

(75) Inventor: Sam Song Liang, Palo Alto, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 651 days.

(21) Appl. No.: 11/280,367

(22) Filed: Nov. 16, 2005

(65) Prior Publication Data

US 2007/0109961 A1 May 17, 2007

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/229; 370/248; 370/252

(58) Field of Classification Search .................. 370/231, 370/235, 248, 249, 252, 229
See application file for complete search history.

(56) References Cited

U.S. PATENT DOCUMENTS

| | | | | |
|---|---|---|---|---|
| 4,914,640 A | * | 4/1990 | Andersen | 367/98 |
| 5,710,756 A | * | 1/1998 | Pasternak et al. | 370/216 |
| 7,385,923 B2 | * | 6/2008 | Baratakke et al. | 370/235 |
| 2003/0204619 A1 | | 10/2003 | Bays | |
| 2003/0225549 A1 | | 12/2003 | Shay et al. | |
| 2005/0220035 A1 | | 10/2005 | Ling et al. | |
| 2005/0232227 A1 | | 10/2005 | Jorgenson et al. | |
| 2005/0276251 A1 | * | 12/2005 | Biddiscombe et al. | 370/338 |
| 2006/0159025 A1 | * | 7/2006 | Abdo et al. | 370/249 |
| 2006/0182039 A1 | * | 8/2006 | Jourdain et al. | 370/252 |
| 2008/0147846 A1 | * | 6/2008 | Behroozi et al. | 709/224 |

* cited by examiner

*Primary Examiner*—Ricky Ngo
*Assistant Examiner*—David Oveissi
(74) *Attorney, Agent, or Firm*—Brian R. Short (57) ABSTRACT

An apparatus and method of determining throughput between a first host and a second host of at least one network is disclosed. The method includes the first host intentionally corrupting ICMP packets by manipulating a checksum of the ICMP packets. The first host sends the corrupted ICMP packets to the second host through the at least one network. The first host additionally sends non-corrupted ICMP packets to the second host. Based on responses from second host to the ICMP packets, the first host estimates a throughput between the first host and the second host. The throughput includes a first direction throughput from the first host to the second host, a second direction throughput from the second host to the first host, and a round trip throughput between the first host and the second host.

20 Claims, 9 Drawing Sheets

THE ACCESS NODE ESTIMATING AN UPLINK TRANSMIT TIME FROM THE ROUND TRIP TRANSMISSION TIME AND THE DOWNLINK TRANSMIT TIME

314

THE ACCESS NODE ESTIMATING THE UPLINK THROUGHPUT BY MULTIPLYING THE NUMBER OF RESPONSE RECEIVED BY THE ACCESS NODE BY THE SIZE OF THE PACKETS, AND DIVIDING A RESULT BY THE UPLINK TRANSMIT TIME

DETERMINING THROUGHPUT BETWEEN HOSTS

FIELD OF THE INVENTION

The invention relates generally to communications. More particularly, the invention relates to a method and apparatus of determining throughput between hosts.

BACKGROUND OF THE INVENTION

Packet networking is a form of data communication in which data packets are routed from a source device to a destination device. Packets can be transmitted directly between a source device and a destination device, or the packets can be relayed through a number of intermediate devices.

A wireless network can include a wireless device (client) being connected to a network through a base station (or gateway) that is wired to the network. The wireless device can transmit data packets that are received by the gateway and then routed through the network. The wireless network can include many gateways that are each wired to the network.

Figure 1:
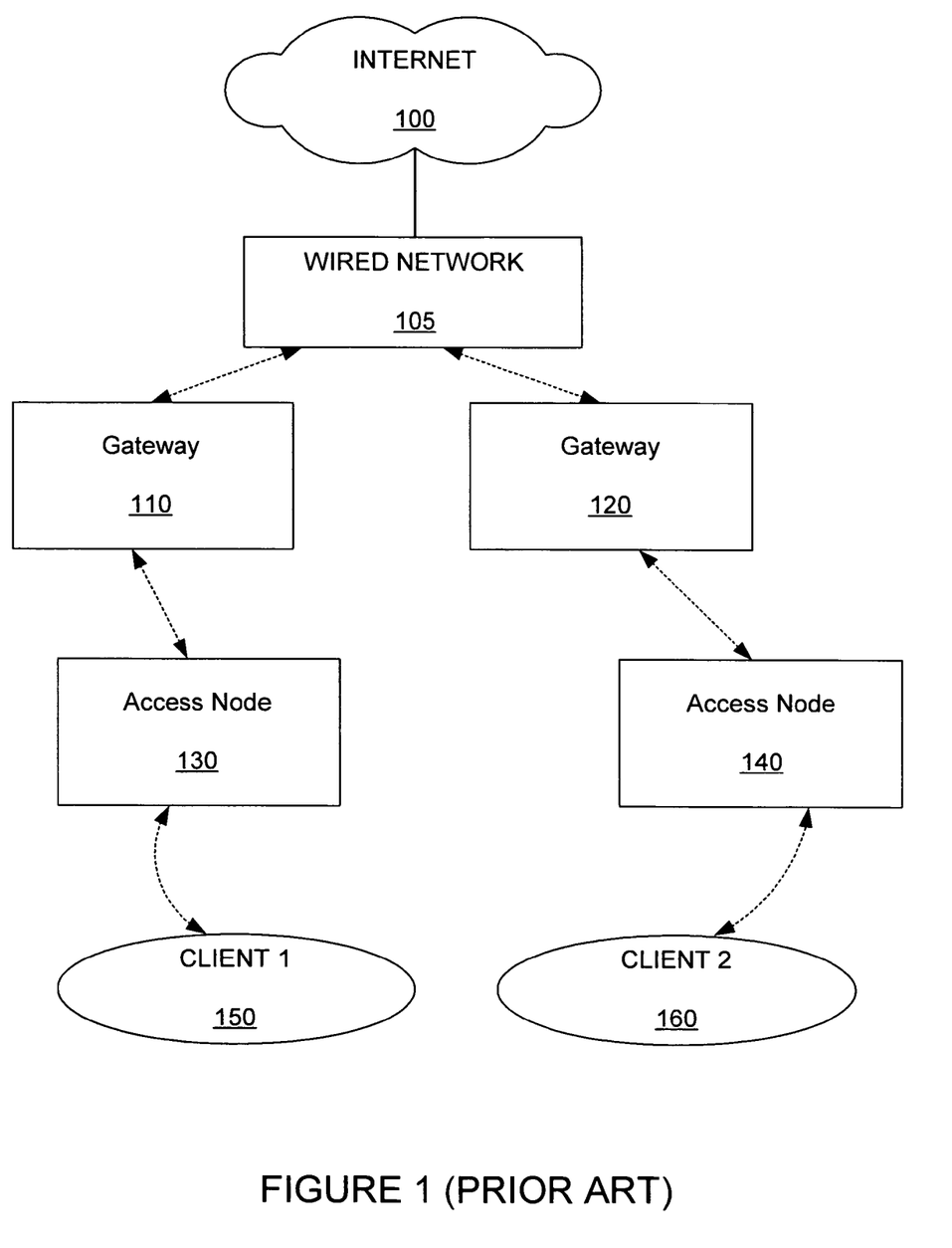
FIG. 1 shows a prior art mesh network.

FIG. 1 shows a prior art mesh network. As shown, clients 150, 160 are able to access an internet network 100 through a wired network 105, and a mesh network that includes gateways 110, 120 and access nodes 130, 140. The mesh network infrastructure including the gateways 110, 120 and the access nodes 130, 140 can be placed, for example, on top of streetlights.

Wireless mesh networks can be more complex than typical networks because wireless networks typically are subject to environmental conditions. For example, wireless links can be subjected to interference, fading and multi-path. As a result, wireless mesh networks typically desire monitoring of the interconnections of the wireless mesh network. A fundamental operating quality metric that is typically desired by a network operator is the data throughput between access nodes or hosts of the network. More specifically, the throughput between access nodes and clients is a very useful quality parameter.

The throughput between hosts of a network can be used to gauge the quality and health of the network. Additionally, throughput between hosts of a network can be used as a measure for comparing different networks.

Wireless mesh network can include access nodes within the mesh network performing routing through the mesh network based upon one or more network operating parameters. Data throughput between gateways and access nodes of the network can be useful in selecting or maintaining selections of routing paths through the mesh network.

Prior art systems measure throughput to a remote host by setting up a server at the remote host. This is difficult because setting up the server requires access to the remote host. Additionally, the server is required to have special throughput measurement software to be configured and run.

It is desirable to have a wireless mesh network that includes access nodes that can determine data throughput between separate hosts of the mesh network. It is desirable that the throughput determinations not require a separate server having throughput measurement software.

SUMMARY OF THE INVENTION

The invention includes an apparatus and method for estimating throughput between hosts of networks. The estimation can be adapted for determining throughput between devices within 802.11 wireless mesh networks.

An embodiment includes a method of determining throughput between a first host and a second host of at least one network. The method includes the first host intentionally corrupting ICMP packets by manipulating a checksum of the ICMP packets. The first host sends the corrupted ICMP packets to the second host through the at least one network. The first host additionally sends non-corrupted ICMP packets to the second host. Based on responses from the second host to the ICMP packets, the first host estimates a throughput between the first host and the second host.

Another embodiment includes a method of determining throughput of an 802.11 link between an access node and a another access node, or a client of a wireless mesh network. The method includes the access node intentionally corrupting ping packets by manipulating a layer four checksum of the ping packets while maintaining a proper layer two CRC of the ping packets. The access node sends the corrupted ping packets to the client. Based on layer two responses from the client, the access node estimates a downlink throughput from the access node to the client. The downlink throughput is estimated by the access node estimating a number of packets received by the client by counting how many layer two responses the access node receives back from the client, and estimating the downlink throughput by multiplying the number of packets received by a size of the packets, and dividing a result by a downlink transmit time.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the invention is embodied in an apparatus and method for estimating throughput between hosts of networks. The estimation can be adapted for determining throughput between devices within 802.11 wireless mesh networks. The estimations do not require a throughput measurement server to be set up at a remote host.

Figure 2:
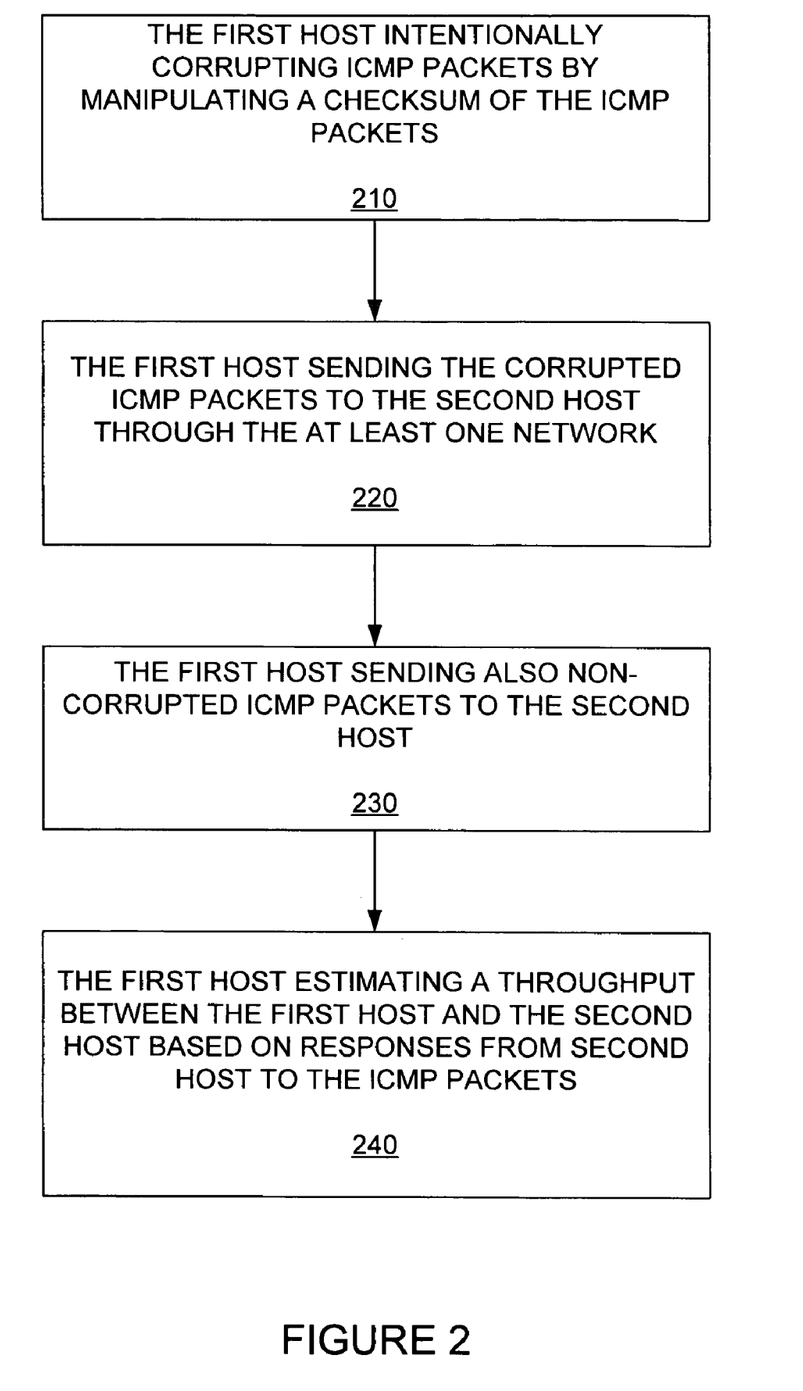
FIG. 2 is a flow chart that shows the steps of a method of determining data throughput between a first host and a second host.

FIG. 2 is a flow chart that shows the steps of a method of determining data throughput between a first host and a second host. A first step 210 includes the first host intentionally corrupting ICMP packets by manipulating a checksum of the ICMP packets. A second step 220 includes the first host sending the corrupted ICMP packets to the second host through the at least one network. A third step 230 includes the first host sending also non-corrupted ICMP packets to the second host. A fourth step 240 includes the first host estimating a throughput between the first host and the second host based on responses from second host to the ICMP packets (as will be described, this includes both corrupted ICMP packets, and non-corrupted ICMP packets). The throughput includes a first direction throughput from the first host to the second host, a second direction throughput from the second host to the first host, and a round trip throughput between the first host and the second host.

Hosts

A host can generally be defined as a device connected to a network. For example, a non-exhaustive list of exemplary hosts includes a router, a server, a computer, a laptop, or an access point.

ICMP Packets

To allow routers in an internet to report errors or provide information about unexpected circumstances, TCP/IP protocols include a special-purpose message mechanism. The mechanism, known as the Internet Control Message Protocol (ICMP), is a required part of internet protocol (IP) and must be included in every IP implementation.

Like all other traffic, ICMP messages travel across the internet in the data portion of IP datagrams. The ultimate destination of an ICMP message is not an application program or user on the destination machine, but rather, the IP software on that machine. If the ICMP determines that a particular higher-level protocol or application program has caused a problem, it will inform the appropriate module. Generally, ICMP allows routers to send error or control messages to other routers or hosts. ICMP provides communication between the IP software on one machine (host) and the IP software on another machine (host).

Generally, an arbitrary host can send an ICMP message to any other host. Therefore, a host can use ICMP to correspond with a router or another host. An advantage of allowing hosts to use ICMP is that it provides a single mechanism for all control and information messages.

ICMP is an error reporting mechanism. It provides a way for routers that encounter an error to report the error to the original source. Although the protocol specification outlines intended uses of ICMP and suggests possible actions to take in response to error reports, ICMP does not fully specify the action to be taken for each possible error.

A properly transmitted ICMP packet (having a proper checksum) causes a receiving host to respond (also referred to as an echo) to the ICMP packet. That is, when a first host sends a proper ICMP packet to a second host, the second host generates a response. The responses, however, echo the payload of the ICMP request packet, and therefore, occupy transmission bandwidth.

Figure 3A:
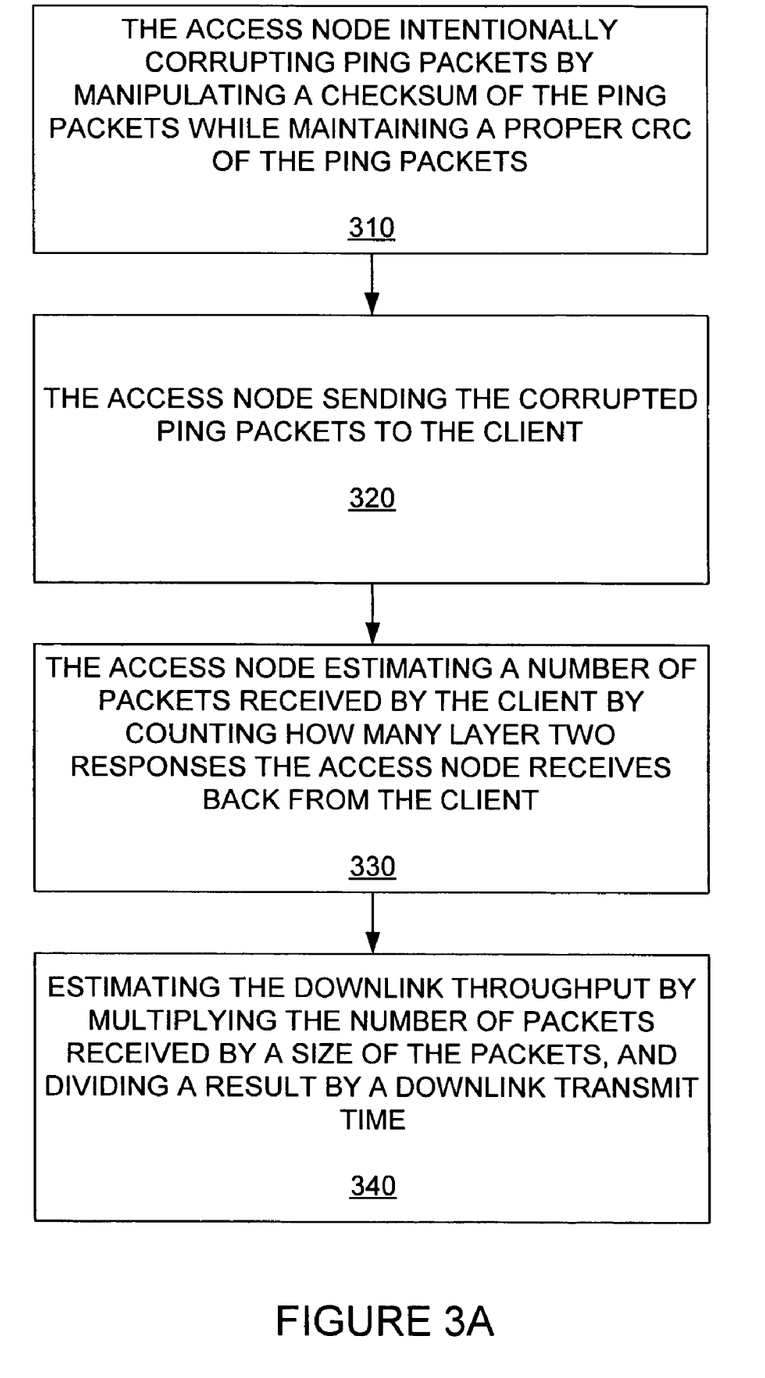
FIG. 3A is a flow chart that shows the steps of a method of determining data throughput of a first direction between a first host and a second host of an 802.11 mesh network.

FIG. 3A is a flow chart that shows the steps of a method of determining data throughput of a first direction between a first host and a second host of an 802.11 mesh network. More specifically, FIG. 3A provides the steps of a method of determining throughput of an 802.11 link between an access node (first host), and another access node or client (second host) of a wireless mesh network through the use of ping packets. A first step 310 includes the access node intentionally corrupting ping packets by manipulating a checksum of the ping packets while maintaining a proper CRC of the ping packets. A second step 320 includes the access node sending the corrupted ping packets to the client. A third step 330 includes the access node estimating a number of packets received by the client by counting how many layer two responses the access node receives back from the client. A fourth step 340 estimating the downlink throughput by multiplying the number of packets received by a size of the packets, and dividing a result by a downlink transmit time.

Ping Packets

TCP/IP protocols can facilitate in identification of network problems. One of the most frequently used debugging tools invokes ICMP echo request and echo reply messages. On many systems, the command invoked to send ICMP echo requests is named "ping". Sophisticated versions of ping send a series of ICMP echo requests, capture responses, and provide statistics about datagram loss. The ping allows specification of the length of the data being sent and the interval between requests. Less sophisticated versions merely send one ICMP echo request and await a reply.

The ping packets (as will be shown later) include a cyclic redundancy check (CRC) and a checksum. The ping packets that have a corrupted checksum will not generate a response at the second host. However, the layer two CRC associated with 802.11 packets, do generate a response. The CRC response only includes a very small number of bits, and therefore, does not interfere with downlink throughput. The corrupted ping packets do not generate a response. This is desirable because response packets generate interference with first direction (downlink) packets, and therefore, make estimates of the first direction (downlink) throughput more difficult.

An exemplary embodiment includes the downlink transmit time being approximated by the time duration of the transmission at the first host.

Figure 3B:
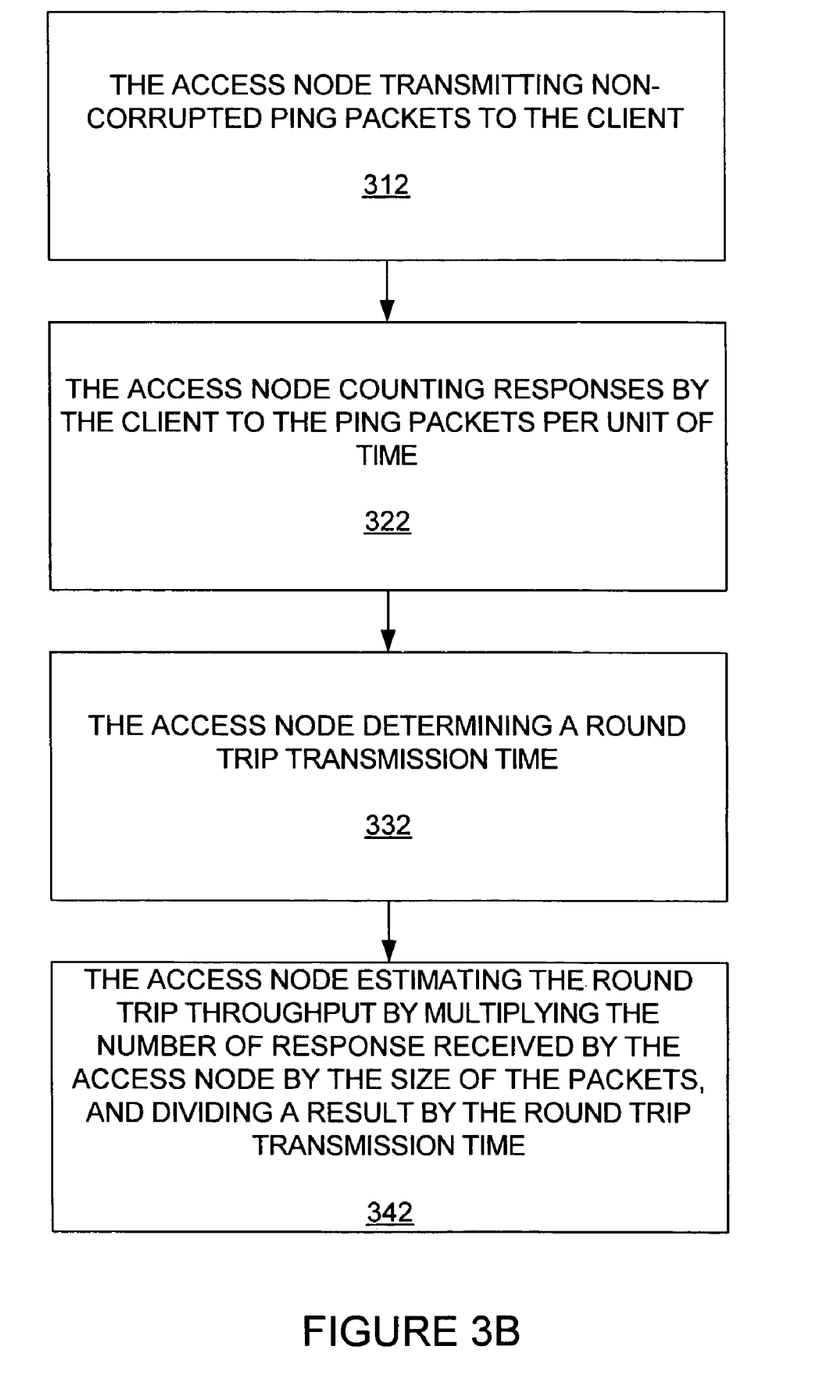
FIG. 3B is a flow chart that shows the steps of a method of determining data throughput of a round trip between a first host and a second host of an 802.11 mesh network.

FIG. 3B is a flow chart that shows the steps of a method of determining data throughput of a round trip between a first host and a second host of an 802.11 mesh network. A first step 312 includes the access node transmitting non-corrupted ping packets to the client. A second step 322 includes the access node counting responses by the client to the ping packets per unit of time. The third step 332 includes the access node determining a round trip transmission time. A fourth step 342 includes the access node estimating the round trip throughput by multiplying the number of response received by the access node by the size of the packets, and dividing a result by the round trip transmission time.

The responses to the ping packets are counted by counting the ping responses received by the first host.

The round trip transmission time can be determined by comparing the time of reception of a response to a time stamp included in the ping packets. That is, the time stamp provides the start time of transmission from the first host, and the time of reception of a response provides the end time of the round trip time. Alternatively, the transmission start time can be stored by the first host, and compared with the reception of a response.

Figure 3C:
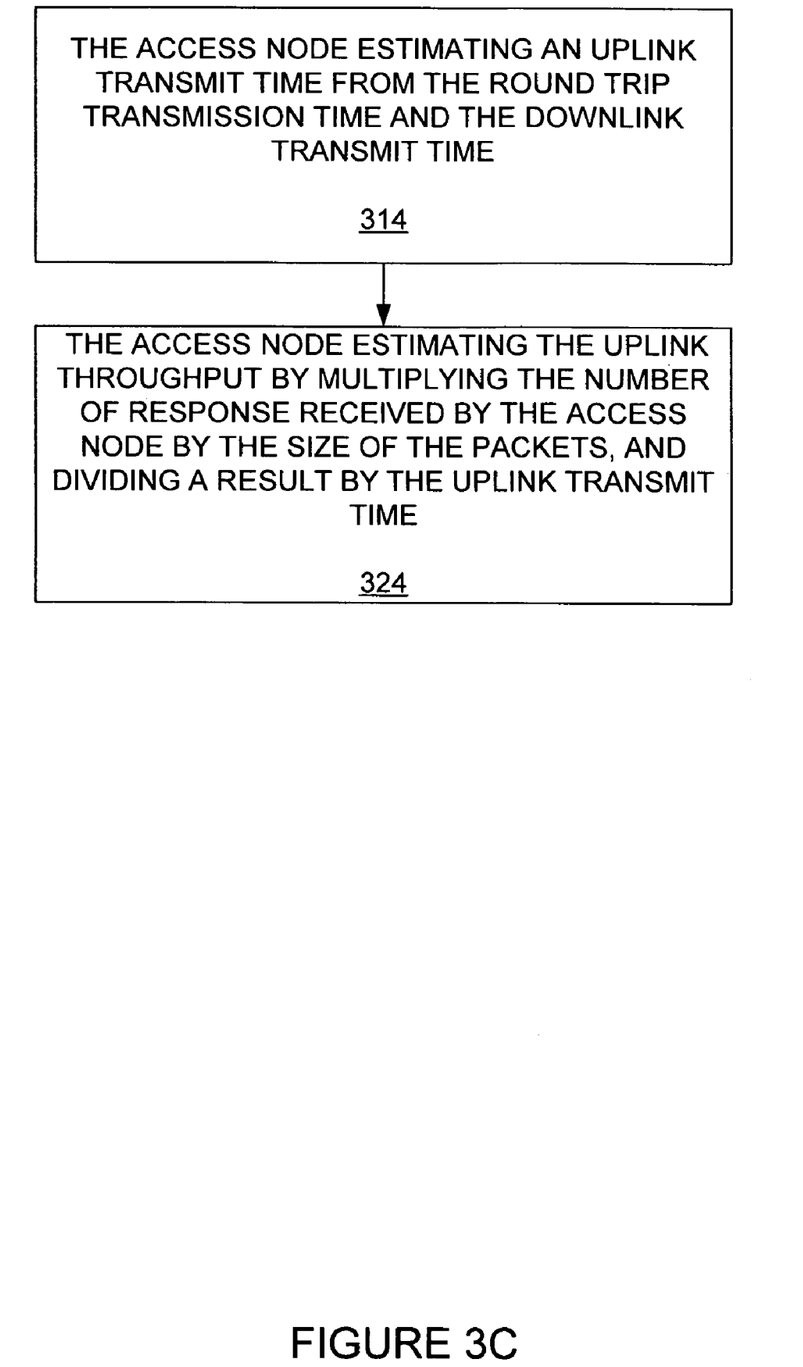
FIG. 3C is a flow chart that shows the steps of a method of determining data throughput of a second direction between a first host and a second host of an 802.11 mesh network.

FIG. 3C is a flow chart that shows the steps of a method of determining data throughput of a second direction (uplink) between a first host and a second host of an 802.11 mesh network. A first step 314 includes the access node estimating an uplink transmit time from the round trip transmission time and the downlink transmit time. A second step 324 includes the access node estimating the uplink throughput by multiplying the number of response received by the access node by the size of the packets, and dividing a result by the uplink transmit time.

Generally, the uplink transmit time can be estimated from the downlink transmit time and the round trip transmission time. More specifically, the uplink transmit time can be determined by subtracting the downlink transmit time from the round trip transmission time.

As stated before, the number of response received by the access node is estimated by counting the number of response received by the access node (first host).

Figure 4:
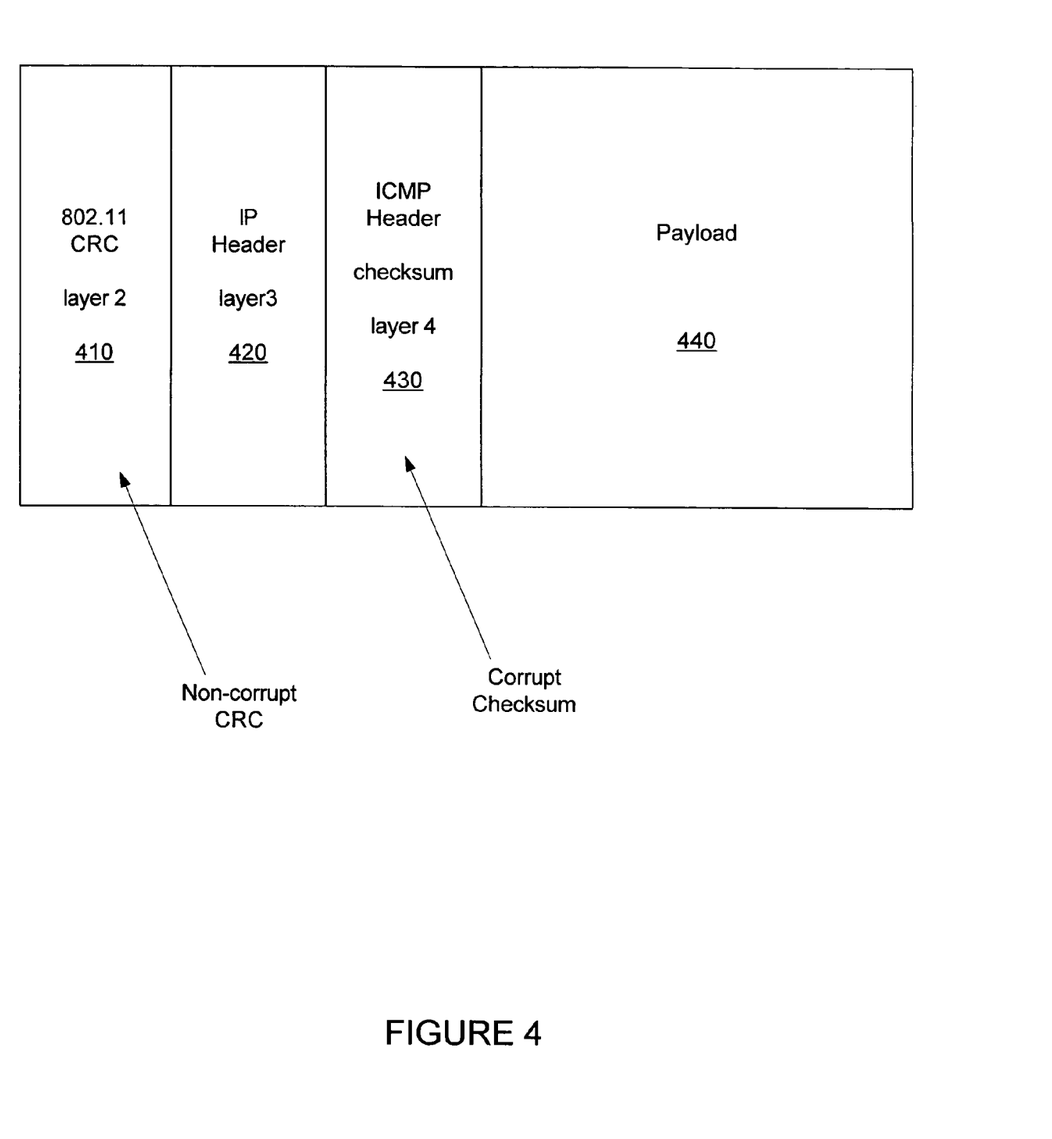
FIG. 4 shows a data packet that includes a layer four checksum that is intentionally corrupted, and a layer two CRC that is correctly set.

FIG. 4 shows a data packet that includes a checksum that is intentionally corrupted, and a CRC that is correctly set. As shown, the packet includes a layer two CRC 410, a layer three IP header 420, a layer four ICMP header 430 that includes a checksum and a payload 440. As described, the embodiments of FIGS. 3A, 3B, 3C include ping packets that include a proper CRC, and an intentionally corrupted checksum. The proper CRCs will generate low data bit CRC responses, but the corrupted checksums do not generate high data bit checksum responses. The non-corrupted CRC is used for packet integrity verification. The corrupt ICMP checksum prevents the second host from responding to the ICMP packet.

Figure 5A:
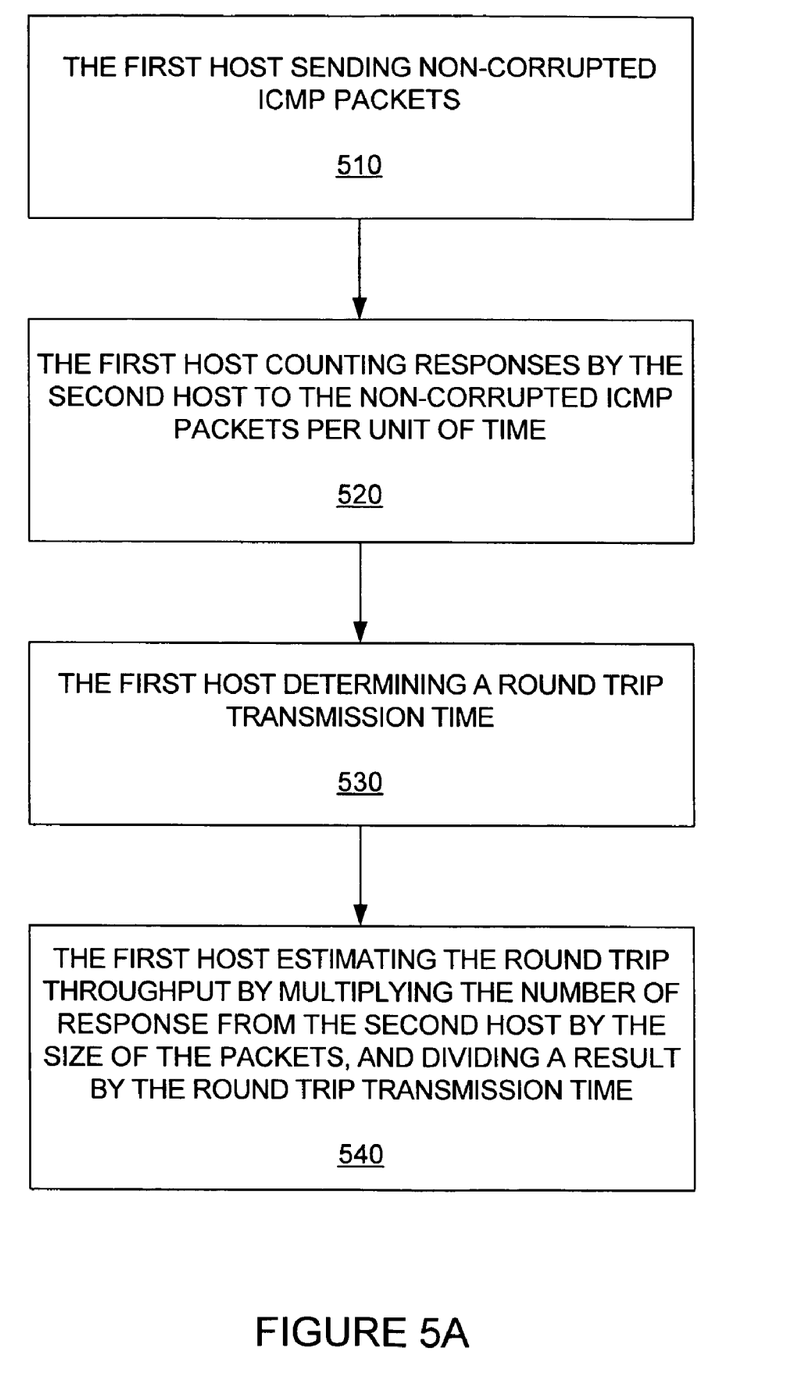
FIG. 5A is a flow chart that shows the steps of a method of determining data throughput of a round trip between a first host and a second host of one or more networks.

FIG. 5A is a flow chart that shows the steps of a method of estimating data throughput of a round trip between a first host and a second host of one or more networks. A first step 510 includes the first host sending non-corrupted ICMP packets. A second step 520 includes the first host counting responses by the second host to the non-corrupted ICMP packets per unit of time. A third step 530 includes the first host determining a round trip transmission time. A fourth step 540 includes the first host estimating the round trip throughput by multiplying the number of response from the second host by the size of the packets, and dividing a result by the round trip transmission time.

As previously described, the responses can be counted by the first host by counting the responses to the non-corrupted ICMP packets.

As previously described, the round trip transmission time can be determined by comparing the time of reception of a response to a time stamp included in the ping packets. That is, the time stamp provides the start time of transmission from the first host, and the time of reception of a response provides the end time of the round trip time.

Figure 5B:
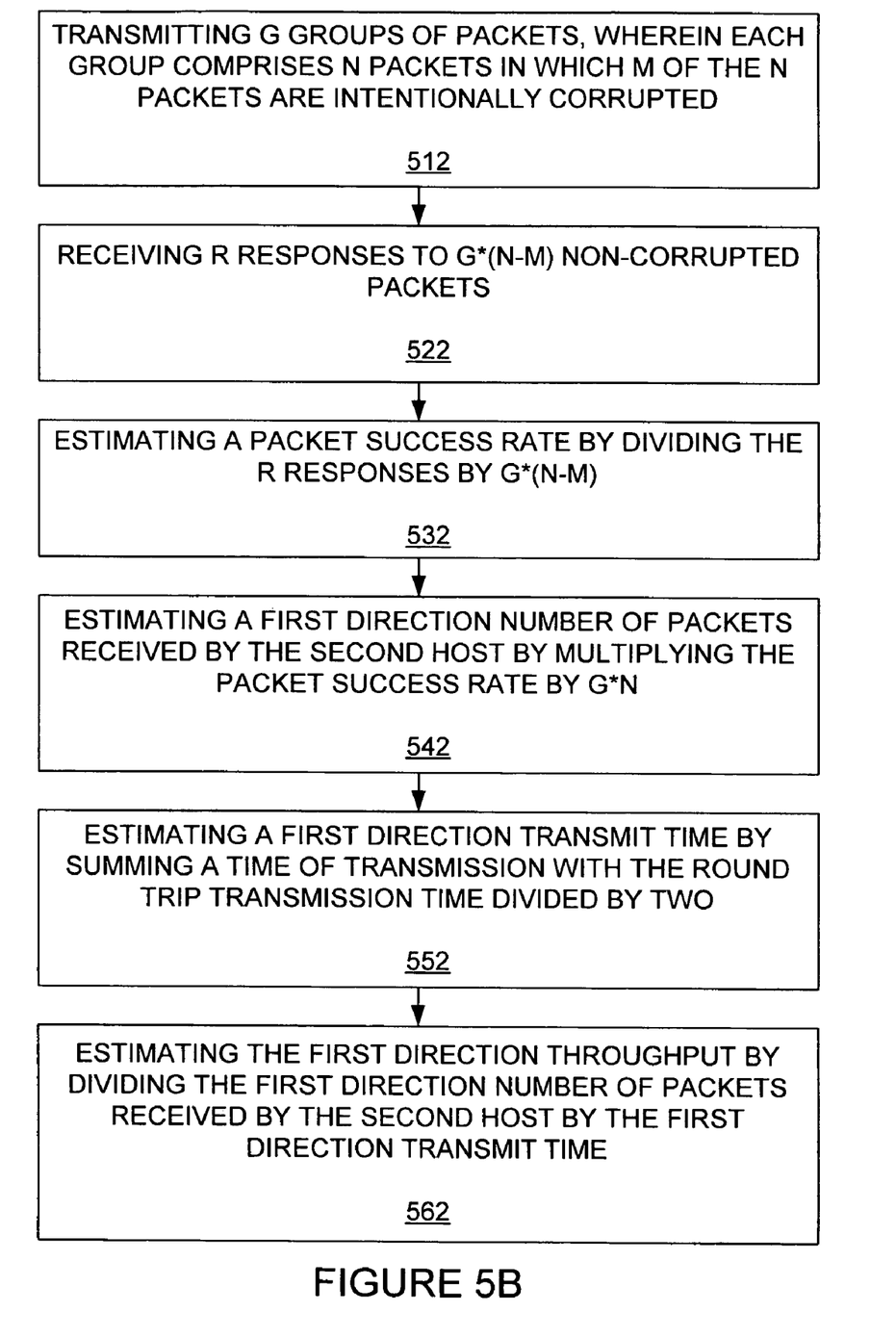
FIG. 5B is a flow chart that shows the steps of a method of determining data throughput of a first direction between a first host and a second host of one or more networks.

FIG. 5B is a flow chart that shows the steps of a method of determining data throughput of a first direction between a first host and a second host of one or more networks. A first step 512 includes transmitting G groups of packets, wherein each group comprises N packets in which M of the N packets are intentionally corrupted. A second step 522 includes receiving R responses to G*(N−M) non-corrupted packets. A third step 532 includes estimating a packet success rate by dividing the R responses by G*(N−M). A fourth step 542 includes estimating a first direction number of packets received by the second host by multiplying the packet success rate by G*N. A fifth step 552 includes estimating a first direction transmit time by summing a time of transmission with the round trip transmission time divided by two. A sixth step 562 includes estimating the first direction throughput by dividing the first direction number of packets received by the second host by the first direction transmit time.

Figure 5C:
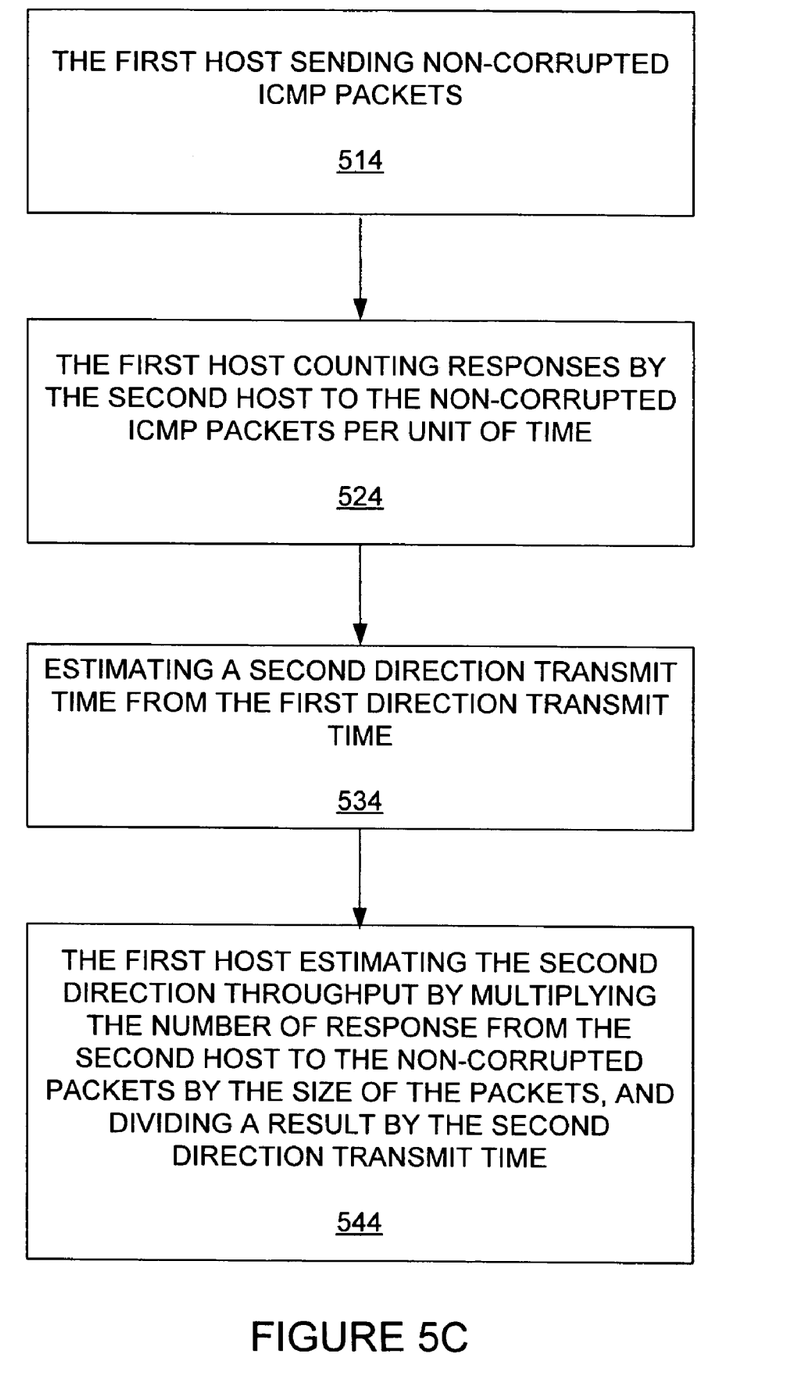
FIG. 5C is a flow chart that shows the steps of a method of determining data throughput of a second direction between a first host and a second host of one or more networks.

FIG. 5C is a flow chart that shows the steps of a method of determining data throughput of a second direction between a first host and a second host of one or more networks. A first step 514 includes the first host sending non-corrupted ICMP packets. A second step 524 includes the first host counting responses by the second host to the non-corrupted ICMP packets per unit of time. A third step 534 includes estimating a second direction transmit time from the first direction transmit time. A fourth step 544 includes the first host estimating the second direction throughput by multiplying the number of response from the second host to the non-corrupted packets by the size of the packets, and dividing a result by the second direction transmit time.

Estimating the second direction transmit time from the first direction transmit time may provide a second direction transmit time that is a high-end estimate. Other methods could be used for determining the second direction transmit time as suggested earlier. As a result, the second direction throughput may be a low-end estimate.

Although specific embodiments of the invention have been described and illustrated, the invention is not to be limited to the specific forms or arrangements of parts so described and illustrated. The invention is limited only by the appended claims.

What is claimed:

1. A method of determining throughput between a first host and a second host of at least one network, comprising;
    the first host intentionally corrupting data packets by manipulating a checksum of the data packets, while maintaining a proper CRC of the data packets;
    the first host sending the corrupted data packets to the second host through the at least one network;
    the first host sending non-corrupted data packets, the non-corrupted data packets maintaining a proper CRC;
    the first host estimating a throughput between the first host and the second host based on layer two CRC responses from the second host to the non-corrupted data packets and the corrupted data packets.

2. The method of claim 1, wherein the throughput comprises a first direction throughput from the first host to the second host, a second direction throughput from the second host to the first host, and a round trip throughput between the first host and the second host.

3. The method of claim 2, wherein a link between the first host and the second host is an 802.11 link, and estimating the first direction throughput comprises:
    the first host estimating a number of packets received by the second host by counting how many layer two CRC responses the first host receives back from the second host;
    estimating the first direction throughput by multiplying the number of received packets by a size of each of the packets, and dividing a result by a first direction transmit time.

4. The method of claim 3, wherein the first direction transmit time is estimated by a time of transmission of packets from the first host.

5. The method of claim 3, wherein estimating the round trip throughput comprises:
    the first host transmitting non-corrupted data packets to the second host;
    the first host counting responses by the second host to the non-corrupted data packets per unit of time;
    the first host timing a round trip transmission time;
    the first host estimating the round trip throughput by multiplying the number of responses received by the first host by the size of each of the packets, and dividing a result by the round trip transmission time.

6. The method of claim 5, wherein estimating the second direction throughput comprises:
    the first host estimating a second direction transmit time from the round trip transmission time, and the first direction transmit time;

the first host estimating the second direction throughput by multiplying the number of response received by the first host by the size of each of the packets, and dividing a result by the second direction transmit time.

7. The method of claim 2, wherein estimating the round trip throughput comprises:
the first host sending non-corrupted data packets;
the first host counting responses by the second host to the non-corrupted data packets per unit of time;
the first host determining a round trip transmission time;
the first host estimating the round trip throughput by multiplying the number of response from the second host by the size of each of the packets, and dividing a result by the round trip transmission time.

8. The method of claim 2, wherein estimating the first direction throughput comprises:
transmitting G groups of packets, wherein each group comprises N packets in which M of the N packets are intentionally corrupted;
receiving R responses to G*(N−M) non-corrupted packets;
estimating a packet success rate by dividing the R responses by G*(N−M);
estimating a first direction number of packets received by the second host by multiplying the packet success rate by G*N;
estimating a first direction transmit time by summing a time of transmission with the round trip transmission time divided by two;
estimating the first direction throughput by dividing the first direction number of packets received by the second host by the first direction transmit time.

9. The method of claim 8, wherein estimating the second direction throughput comprises:
the first host sending non-corrupted data packets;
the first host counting responses by the second host to the non-corrupted data packets per unit of time;
estimating a second direction transmit time from the first direction transmit time;
the first host estimating the second direction throughput by multiplying the number of response from the second host to the non-corrupted packets by the size of each of the packets, and dividing a result by the second direction transmit time.

10. A method of determining throughput of an 802.11 link between an access node and a client of a wireless mesh network comprising;
the access node intentionally corrupting ping packets by manipulating a checksum of the ping packets while maintaining a proper CRC of the ping packets;
the access node sending the corrupted ping packets to the client;
based on layer two CRC responses from the client, the access node estimating a downlink throughput from the access node to the client, comprising;
the access node estimating a number of ping packets received by the client by counting how many layer two CRC responses the access node receives back from the client;
estimating the downlink throughput by multiplying the number of ping packets received by a size of each of the ping packets, and dividing a result by a downlink transmit time.

11. The method of claim 10, wherein the downlink transmit time is estimated by a packet transmission time of the access node.

12. The method of claim 10, further comprising estimating a round trip throughput between the access node and the client, comprising:
the access node transmitting non-corrupted ping packets to the client;
the access node counting responses by the client to the ping packets per unit of time;
the access node determining a round trip transmission time;
the access node estimating the round trip throughput by multiplying the number of response received by the access node by the size of each of the packets, and dividing a result by the round trip transmission time.

13. The method of claim 12, further comprising estimating an uplink throughput, comprising:
the access node estimating an uplink transmit time from the round trip transmission time and the downlink transmit time;
the access node estimating the uplink throughput by multiplying the number of response received by the access node by the size of each of the packets, and dividing a result by the uplink transmit time.

14. A method of determining throughput of an 802.11 link between an first access node and a second access node of a wireless mesh network comprising;
the first access node intentionally corrupting ping packets by manipulating a checksum of the ping packets while maintaining a proper CRC of the ping packets;
the first access node sending the corrupted ping packets to the second access node;
based on layer two responses from the second access node, the first access node estimating a first direction throughput from the first access node to the second access node, comprising;
the first access node estimating a number of packets received by the second access node by counting how many layer two responses the first access node receives back from the second access node;
estimating the first direction throughput by multiplying the number of packets received by a size of each of the packets, and dividing a result by a first direction transmit time.

15. The method of claim 14, wherein the first direction transmit time is estimated by a packet transmission time of the access node.

16. The method of claim 14, further comprising estimating a round trip throughput between the first access node and the second access node, comprising:
the first access node transmitting non-corrupted ping packets to the second access node;
the first access node counting responses by the second access node to the ping packets per unit of time;
the first access node determining a round trip transmission time;
the first access node estimating the round trip throughput by multiplying the number of response received by the first access node by the size of each of the packets, and dividing a result by the round trip transmission time.

17. The method of claim 16, further comprising estimating an uplink throughput, comprising:
the first access node estimating an second direction transmit time from the round trip transmission time and the first transmit time;
the first access node estimating the second direction throughput by multiplying the number of response received by the first access node by the size of each of the packets, and dividing a result by the uplink transmit time.

18. A mesh network access node comprising:
means for intentionally corrupting ping packets by manipulating a checksum of the ping packets while maintaining a proper CRC of the ping packets;
means for sending the corrupted ping packets to a client;
means for estimating a downlink throughput from the access node to the client based on layer two responses from the client, comprising;
   means for estimating a number of packets received by the client by counting how many layer two responses the access node receives back from the client;
   means for estimating the downlink throughput by multiplying the number of packets received by a size of each of the packets, and dividing a result by a downlink transmit time.

19. The access node of claim 18, further comprising means for estimating a round trip throughput between the access node and the client, comprising:
means for transmitting non-corrupted ping packets to the client;
means for counting responses by the client to the ping packets per unit of time;
means for determining a round trip transmission time;
means for estimating the round trip throughput by multiplying the number of response received by the access node by the size of each of the packets, and dividing a result by the round trip transmission time.

20. The access node of claim 19, further comprising means for estimating an uplink throughput, comprising:
means for estimating an uplink transmit time from the round trip transmission time and the downlink transmit time;
means for estimating the uplink throughput by multiplying the number of response received by the access node by the size of each of the packets, and dividing a result by the uplink transmit time.

* * * * *